May 5, 1959  F. H. MUELLER  2,884,808
DRIVE FOR DRILLING MACHINE
Filed Oct. 23, 1957  2 Sheets-Sheet 1
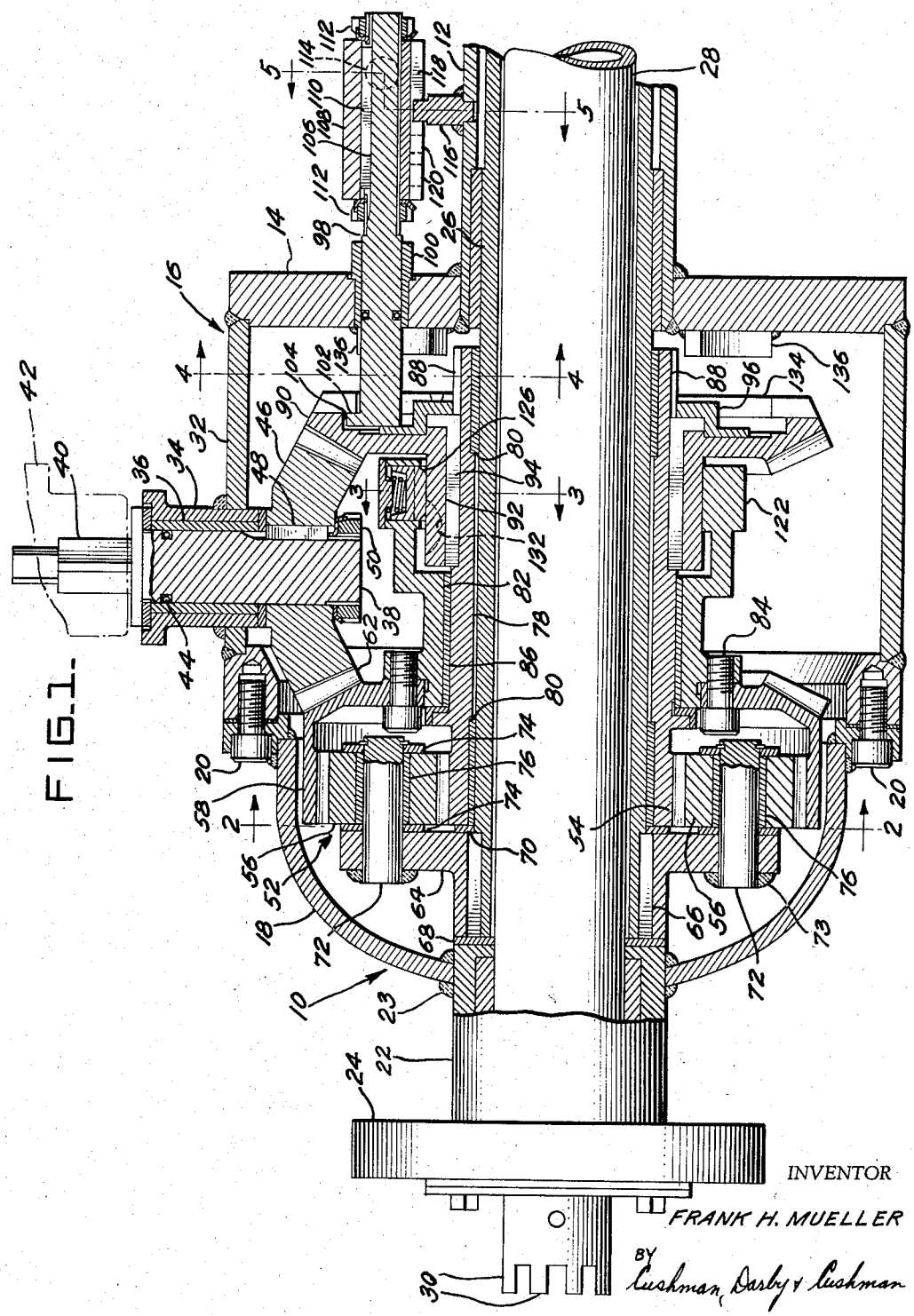
INVENTOR
FRANK H. MUELLER
BY
Cushman, Darby & Cushman
ATTORNEYS May 5, 1959
F. H. MUELLER
2,884,808
DRIVE FOR DRILLING MACHINE
Filed Oct. 23, 1957
2 Sheets-Sheet 2
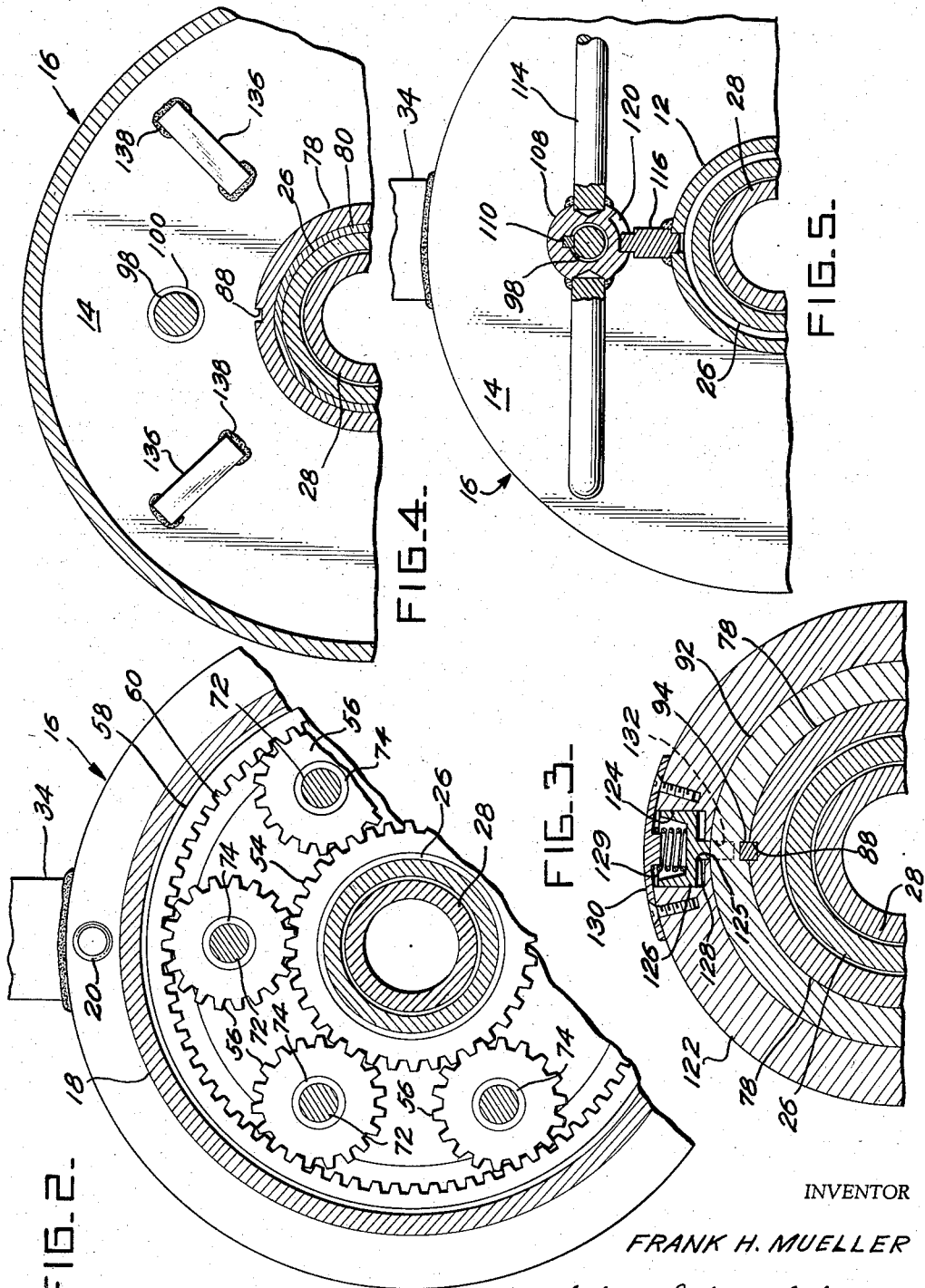
INVENTOR
FRANK H. MUELLER
BY *Cushman, Darby & Cushman*
ATTORNEYS

United States Patent Office 2,884,808
Patented May 5, 1959

2,884,808

DRIVE FOR DRILLING MACHINE

Frank H. Mueller, Decatur, Ill., assignor to Mueller Co., Decatur, Ill., a corporation of Illinois Application October 23, 1957, Serial No. 691,836

14 Claims. (Cl. 74—674)

The present invention relates to machines for drilling or tapping mains and pipes without the escape of fluid pressure therefrom, and more particularly, pertains to improvements in drilling machines of the type disclosed in United States Patents Nos. 1,956,129, 2,470,044 and 2,646,699.

Drilling machines of the type disclosed in the aforementioned patents are provided with a pressure-tight housing completely enclosing a boring or drilling bar that is usually driven by power but may be driven by hand. A drive tube coaxial with the boring bar is usually connected to a suitable source of power and the rotation of the drive tube, which is operatively coupled to the boring bar by a feed mechanism imparts axial and rotary movement to the boring bar. The feed mechanism is provided with a clutch device which, upon its disengagement, permits hand advance of the boring bar by rotation of a crank handle connected directly to the feed mechanism. Means are usually provided on the drilling machines of the type under consideration, for determining the axial position of the boring bar at all times, so that the operator can have the machine under complete control throughout the boring operation.

In the means for driving the drilling machine of the type under consideration by power, a constant speed and torque was applied to the drive tube by a direct connection between the drive tube and the source of power. In present-day operation, where different size mains and mains made of various materials require different drilling tools for use with the boring bar, it has been found desirable to provide a varied speed and torque to the boring bar. Accordingly, the present invention relates to improvements in drives for drilling machines, the drives being provided with means to vary the speed and torque of the boring or drilling bar so as to accommodate the various load conditions encountered in present-day operation.

An object of the present invention is to provide a drilling machine with a transmission for imparting variable speed to the drilling bar and the tool carried thereby.

Still another object of the present invention is to provide a drilling machine utilizing a variable speed transmission which will effect a three-speed change to the rotation and advancement of the boring bar.

A still further object of the present invention is to provide a simple and compact transmission for a drilling machine, the transmission being easily operable to change the speed and torque of the drilling or boring bar of the drilling machine.

Another object of the present invention is to provide a drilling machine with a planetary transmission which is capable of varying the speed and torque of the boring bar of the machine, the transmission being compact and efficient.

A further object of the present invention is to provide a planetary transmission wherein the sun and ring gears are continuously in engagement with the planetary gears yet a speed change is effected by varying the rotational movement of the sun and ring gears with respect to each other.

These and other objects of the present invention will appear more fully in the following specification, claims and drawings, in which:

Figure 1 is a fragmentary side view of a drilling machine, partly in elevation and partly in section, showing the embodiment of the present invention.

Figure 2 is a sectional view taken on the line 2—2 of Figure 1.

Figure 3 is an enlarged sectional view taken on the line 3—3 of Figure 1.

Figure 4 is a sectional view taken on the line 4—4 of Figure 1, and

Figure 5 is a sectional view taken on the line 5—5 of Figure 1.

Referring now to the drawings, wherein like characters or reference numerals represent like or similar parts, the drilling machine, generally designated by the numeral 10, is of the type disclosed in the aforementioned United States Patents Nos. 1,956,129, 2,470,044 and 2,646,699, and includes a barrel 12 provided with a bottom flange 14 forming the top wall of a lower gear housing, generally designated by the numeral 16. The housing 16 has a removable lower wall 18 bolted thereto by means of machine screws or studs 20. A tubular extension 22, provided with a flange 24 at its extremity, is welded to the lower wall 18, as indicated at 23, in axial alignment with the barrel 12. Flange 24 is adapted to be bolted in the usual manner to one end of a valve (not shown) attached to the main or pipe to be drilled. The bit of the drilling machine passes through the valve into engagement with the wall of the pipe or main.

The upper end of barrel 12 (not shown) is of the usual type disclosed in the aforementioned Patents Nos. 1,956,129, 2,470,044 and 2,646,699, and includes a feed mechanism for coupling a drive tube 26 with a boring or drilling bar 28, the feed mechanism effecting axial and rotary movement to the latter. As shown in Figure 1, the lower end of the hollow boring bar 28 is provided with jaws 30 to drive a cutting tool (not shown) which may be a shell-type cutter, or the like.

Gear housing 16 is provided in its peripheral wall 32 with a boss 34 having an axis which is substantially radial of the axis of drive tube 26. A bushing 36 fixed in the boss 34 provides a journal for a driving stub shaft 38 having a flanged outer end. A portion 40 of stub shaft 38 extends out of the housing and is adapted to be received in a complementary-shaped socket of and driven by an air motor 42 shown in the dot-dash lines. Suitable O-rings 44 are interposed between the bearing 36 and stub shaft 38 so as to provide a tight seal to prevent the escape of oil from the housing. A bevel gear 46 is keyed to the inner end of stub shaft 38 by a key 48 or the like, the bevel gear being prevented from axial movement by means of a lock nut 50.

Disposed within gear housing 16 and adapted to be driven by the driving bevel gear 46 is a planetary transmission mechanism generally designated by the numeral 52 and shown in Figures 1 and 2. The planetary transmission mechanism includes a sun gear 54, planet gears 56 and a ring gear 58. The ring gear 58 is provided with internal teeth 60 which mesh with the planet gears 56 and external teeth 62, which mesh constantly with the teeth of driving bevel gear 46. Planet gears 56 are carried by a planet gear carrier 64 which is fixed on the drive tube 26 by keys 66. A thrust washer 68 interposed between the end of the planet gear carrier 64 and the upper end of the tubular extension 22 prevents axial movement of the gear carrier, as the other end of the gear carrier abuts against a thrust washer 70 engaged with the end of the sun gear 54. The planet gears 56 are rotatably supported on stub shafts 72 which are welded to the gear carrier 64, as indicated at 73, and extend parallel to the axis of the drive tube 26. Suitable thrust bearings 74 are provided on each side of the planet gears 56, whereas a sleeve bearing 76 is interposed between the stub shafts 72 and the planet gears 56 so that they may have free rotation with respect to the gear carrier, as the gear carrier itself is rotated.

The sun gear 54 is rotatably mounted on the drive tube 26 and is provided with an extended hub portion 78. So that there may be free relative rotation between the drive tube 26 and the sun gear 54, bearings 80 are interposed between the drive tube and the sun gear at each end of the hub of the sun gear.

Ring gear 58 is provided with an extended hub portion 82 coaxial with and rotatably journaled on the hub portion 78 of sun gear 54. As shown in Figure 1, the hub portion 82 of ring gear 58 is bolted to the main body portion of the ring gear by machine screws or studs 84. A sleeve bearing 86 interposed between the hub 82 and the hub 78 provides for free relative rotation between the sun gear 54 and the ring gear 58.

The outer end portion of hub 78 is provided with keyways 88. An auxiliary bevel gear 90 having a hub 92 is keyed to the hub 78 by an L-shaped key 94 provided in the keyways 88. The L-shaped keys 94 are prevented from axial movement with respect to the hub 92 of bevel gear 90 by means of a retainer plate 96 having an offset circular flange. By having the keyway 88 in the hub portion 78 of sun gear 54 longer than the key 94 the gear 90, which is concentric with the drive tube 26, may be shifted axially of the sun gear but rotates with or is locked to the sun gear 54 at all times.

As shown in Figure 1, the bevel gear 90 is meshing with the bevel drive gear 46 so that it rotates in an opposite direction to the rotation of ring gear 58. Since bevel gear 90 is keyed to the hub of sun gear 54, the sun gear when the bevel gear 90 is in the position shown in Figure 1, is caused to rotate in an opposite direction to the ring gear 58, thus imparting a predetermined speed and torque to the drive tube 26 through the rotation of the planet gear carrier 64.

A shift lever or rod 98 having an axis parallel to the axis of the drive tube and extending through a bushing 100 carried in the end wall 14 of housing 16 is provided with a lug 102 on its inner end which is adapted to engage in a groove 104 provided in the bevel gear 90. The inner end of the lever 98 bears against the plate 96 to retain the latter in position against the gear 90. The outer end 106 of shift lever 98 is provided with a sleeve 108 keyed thereto by a key 110. The sleeve 108 is prevented from axial movement on the shift lever 98 by means of lock nuts 112 carried on the lever 98 and between which the sleeve is interposed. A suitable handle 114 is carried by the sleeve 108 for shifting the bevel gear 90 axially of the sun gear 54. A pin lug 116 welded to the barrel 12 rides in a longitudinally extending slot 118 provided in the sleeve 108. Spaced along the longitudinal slot 118 are three circumferentially extending slots 120 which provide a means of locking the lever 98 in one of three fixed longitudinal positions. As is now evident, by turning or rotating the handle 114 approximately one-eighth of a revolution, the lug 116 can be aligned with the longitudinal slot 118 and the rod 98 can be shifted axially to three positions so that the bevel gear 90 will assume three separate positions axially with respect to the sun gear 54.

Referring now to Figures 1 and 3, the hub portion 82 of ring gear 58 is enlarged at its outer end, as indicated at 122, so that the hub 92 of the bevel gear 90 is interposed between it and the hub 78 of sun gear 54. A radially extending bore 124 is provided in the enlarged portion 122 of hub 82, the bore 124 being provided with a slot 125 at its lower end. A locking pin 126, having a tongue 128 adapted to fit through the slot 125 in the bore 124, is disposed within the bore. A spring 129 interposed between a cover-plate 130 and the locking pin 126 urges the locking pin inwardly toward the hub 92 of the bevel gear 90. Hub 92 is provided with an arcuate-shaped slot 132, as shown in Figure 1, which is adapted to receive the locking pin 126 when the bevel gear 90 is moved axially of the sun gear 54 toward the right of Figure 1. When the bevel gear has moved to a position where the locking pin 126 drops into the slot 132 the bevel gear will be disengaged from the bevel drive gear 46 and the ring gear will be locked thereto.

Accordingly, when the bevel gear 90 is in this position, the ring gear will cause the bevel gear 90 to rotate in the same direction as the ring gear and since the bevel gear 90 is keyed to the hub 78 of the sun gear 54, the sun gear will rotate in the same direction as the ring gear. In effect, the sun gear 54 and the ring gear 58 will rotate as a unit so that there will be no relative rotation of the planetary gears 56 with respect to the planetary gear carrier 64. A direct drive between the bevel gear 46 and the drive tube 26 is effected by moving the bevel gear 90 to the above-described position.

Referring now to Figures 1 and 4, the bevel gear 90 is provided with radially extending abutments 134 spaced circumferentially from each other. The bottom flange 14, which provides the top cover of the gear housing 16, is provided with radially disposed abutments or blocks 136 welded thereto, as indicated at 138. When the lever 98 is moved further toward the right of Figure 1, the locking pin 126 will move out of the slot 132 so that there can be relative rotation between the ring gear 58 and the bevel gear 90. Continued movement to the right of Figure 1 will cause the abutments or blocks 134, provided on the gear 90, to engage the abutments 136 on the flange 14. This will lock the gear 90 against rotation and because the gear 90 is keyed to the sun gear 54, the sun gear will also be locked against rotation so that it is stationary while the ring gear 58 continues to rotate.

The operation of the drilling machine 10 of the present invention may be described briefly as follows. The lower flange 24 of the drilling machine 10 is bolted, in the usual manner, to a valve positioned on a pipe or main adjacent the position where the main is to be tapped or drilled. Assuming that a low speed is desired for advancement and rotation of a tool by the boring bar 28, the shift lever 98 is moved inwardly to the position disclosed in Figure 1. When in this position, the shift bar is rotated approximately one-eighth of a turn so that the pin lug 116, carried by the barrel 12, will ride in rearwardmost slot 120 and lock the shift lever against axial movement. When in this position, the bevel gear 90 is meshing with the bevel drive gear 46. Since the ring gear 58 also meshes with the bevel drive gear 46 but on an opposite side of the axis of stub shaft 38, the bevel gear 90 will rotate in an opposite direction to the ring gear 58. Rotation of the bevel gear 90 will cause rotation of the sun gear 54 in an opposite direction to the ring gear 58 so that the planetary gears will rotate as the planetary gear carrier 64 imparts or effects rotary movement to the drive tube. This predetermined low speed of rotation and high torque developed by the drive tube 26 will be imparted to the boring bar through the feed mechanism coupling the drive tube and boring bar.

Axial movement of shift lever 98 to the right of Figure 1 shifts the gear 90 to a second position where it is out of engagement with the bevel drive gear 46 but is locked to the ring gear 58 through the locking pin 126. By locking the ring gear 58 to the gear 90, the sun gear 54, which is keyed to the gear 90, rotates in the same direction as the ring gear and therefore a direct drive is effected between the bevel gear 46 and the drive tube 26. When the locking lever is in the second position, the ring gear 58, planetary gears 56 and sun gear 54, rotate as a unit and the rotational speed developed by the drive tube 26 is maximum, with minimum torque.

Movement of the shift lever 98 to a position further to the right of Figure 1 will cause the gear 90 to shift to a position where the locking pin 126 is released from locking engagement in the slot 132. The abutments 134 on the gear 90 will engage the abutments or blocks 136 on the wall 14 so that it will remain stationary with respect to the housing 16. Holding the gear 90 stationary with respect to the housing 16 also holds the sun gear 54 stationary with respect to the housing and therefore the planetary gears 56 will rotate on the planetary gear carrier 64 as the ring gear 58 is rotated. This gives an intermediate output speed to the rotation of the planetary gear carrier 64 and consequently the planetary gear carrier will rotate the drive tube at an intermediate speed and torque.

From the foregoing description, it will now be evident that the planetary transmission of the present invention, embodied in a drilling machine, provides a compact and efficient mechanism for providing a three speed change to the rotation and axial displacement of the boring bar. The variable speed transmission adds to the utility of the drilling machine, in that various load conditions encountered in present-day operations may be effectively compensated for by varying the speed and torque of the drilling bit. By providing a planetary transmission wherein the sun, planetary and ring gears are in continuous meshing engagement with each other and yet have the transmission so arranged that variable speeds may be realized therefrom, the unit has more durability for the rough operation encountered in the drilling or tapping of large mains or pipes.

It is now apparent that the objects of the present invention have been fully and effectively accomplished. However, the foregoing specific embodiment shown and described, illustrates only the principle of the invention and it is of course within the scope of the present invention that modifications to the specific embodiment shown and described, may be made without departing from the principle of the invention. Therefore, the terminology used in this specification is for the purpose of description and not limitation, the scope of the invention being defined in the claims.

I claim:

1. In a drilling machine having a rotatably movable boring bar, a transmission mechanism for providing differential rotational speeds to the boring bar comprising: a rotatable drive shaft adapted to be operatively coupled to the boring bar for effecting rotatable movement thereto; a planetary gear mechanism for imparting rotary movement to said drive shaft, said planetary gear mechanism including a sun gear rotatably mounted on said drive shaft, a gear carrier fixed to said drive shaft, at least one planet gear carried by said gear carrier and meshing with said sun gear, and a ring gear meshing with said planet gear; prime mover means cooperating with said ring gear for rotating the same; and means selectively operable to vary speed of rotation of said drive shaft, said last-mentioned means including a rotatable element coaxially mounted with respect to said drive shaft, said rotatable element being fixed against rotation and movable axially with respect to said sun gear, means to move said rotatable element axially of said sun gear, means responsive to axial movement of said rotatable element to a first position for coupling said rotatable element to said prime mover for rotation in an opposite direction to rotation of said ring gear, means responsive to axial movement of said rotatable element to a second position for coupling said rotatable element to said ring gear for rotation therewith, and means responsive to movement of said rotatable element to a third position for locking the same against rotation in either direction.

2. The structure defined in claim 1, wherein said ring gear includes a second set of teeth elements, said prime mover means includes a bevel gear meshing with said second set of teeth elements of said ring gear for driving the same in a predetermined direction; and wherein said means responsive to movement of said rotatable element to a first position includes teeth elements meshing with said bevel gear of said prime mover means whereby said rotatable element is driven in an opposite direction to said ring gear.

3. The structure defined in claim 1, wherein said means responsive to movement of said rotatable element to a second position includes a spring-biased locking pin adapted to lock said ring gear to said rotatable element when the teeth of said rotatable element are disengaged from said bevel gear.

4. The structure defined in claim 1, including a housing for said transmission mechanism and wherein said means responsive to movement of said rotatable element to a third position includes abutment means carried by said housing and said rotatable element, whereby said rotatable element is prevented from rotating with respect to said housing.

5. In a drilling machine having a rotatably movable boring bar, a transmission comprising: a housing; a rotatable drive shaft operatively coupled to the boring bar for effecting rotatable movement thereto; a planetary gear mechanism mounted within said housing for imparting rotary movement to said drive shaft, said planetary gear mechanism including a sun gear rotatably mounted on said drive shaft and having an extended hub portion, a gear carrier fixed to said drive shaft, at least one planet gear carried by said gear carrier and meshing with said sun gear, and a ring gear meshing with said planet gear, said ring gear having an extended hub portion coaxial with the extended hub portion of said sun gear and a set of bevel teeth elements; a bevel drive gear meshing with the set of bevel teeth elements on said ring gear for rotating the same; a gear element fixed against rotation and shiftable axially with respect to said extended hub portion of said sun gear; said gear element when in a first position being in mesh with said bevel drive gear and driven thereby in a direction opposite of said ring gear, means to selectively shift said gear element axially of said sun gear out of engagement with said bevel drive gear to a second position and to a third position; means to lock said gear element to said ring gear when moved to said second position whereby said sun gear is rotated in the same direction as said ring gear; and means to lock said gear element to said housing when moved to said third position whereby said sun gear is stationary with respect to said ring gear.

6. The structure defined in claim 5, wherein said means to lock said gear element to said ring gear includes a spring-biased locking pin adapted to key the extended hub portion of said ring gear with said gear element.

7. The structure defined in claim 5, wherein said means to lock said gear element to said housing includes extending abutments carried by said housing and adapted to engage abutments on said gear element.

8. The structure defined in claim 5, wherein said means to shift said gear element axially of said sun gear includes a shaft extending through said housing and operatively connected to said gear element, said shaft being shiftable on axis parallel to the axis of said gear element and including means to selectively hold said gear element in meshing engagement with said bevel drive gear, in locking engagement with said ring gear and in locking engagement with said housing.

9. In a drilling machine having a rotatably and axially movable boring bar, a transmission comprising: a housing; a tubular drive shaft coaxial to the boring bar for effecting rotatable and axial movement to the boring bar; a planetary gear mechanism mounted within said housing and coaxial with said tubular drive shaft, said planetary gear mechanism including a sun gear rotatably mounted on said drive shaft and having an extended hub portion, a gear carrier fixed to said drive shaft, at least one planet gear carried by said gear carrier and continuously meshing with said sun gear, a ring gear continuously meshing with said planet gear and having an extended hub portion coaxial with the extended hub portion of said sun gear; a drive gear meshing with said ring gear for rotating the same; an auxiliary gear element fixed against rotation and movable axially with respect to said sun gear, said auxiliary gear element having a hub portion extending intermediate the extended hub portions of said sun gear and said ring gear; means to selectively shift said auxiliary gear axially of said sun gear to a first position where it meshes with said drive gear and rotates in an opposite direction to said ring gear so that said sun gear rotates in an opposite direction to said ring gear, to a second position where said auxiliary gear is out of engagement with said drive gear and is locked to said ring gear so that said sun gear rotates in the same direction as said ring gear, and to a third position where said auxiliary gear is locked to said housing and out of engagement with said drive gear whereby said sun gear is held stationary with respect to said ring gear.

10. The structure defined in claim 9, including a spring-biased means for locking the extended portion of said ring gear to said auxiliary gear when the latter is in said second position, said means including a spring-biased key element carried by said ring gear and a slot on the hub of said auxiliary gear for receiving the spring-biased key element.

11. The structure defined in claim 9, including means for preventing rotation of said auxiliary gear when in said third position, said means including cooperating abutments on said housing and said auxiliary gear.

12. The structure defined in claim 9, wherein said means for shifting said auxiliary gear axially of said sun gear includes a shaft extending through said housing and shiftable on an axis parallel to the axis of said auxiliary gear, said shaft being operatively connected to said auxiliary gear and means to lock said shaft against axial movement when said auxiliary gear is selectively in said first, second and third positions.

13. A transmission for effecting variable speed to a rotatable shaft comprising: a housing; a planetary gear mechanism disposed within said housing, said planetary gear mechanism including a sun gear rotatably mounted on the shaft, a gear carrier fixed to the shaft, at least one planet gear carried by said gear carrier and continuously meshing with said sun gear, a ring gear continuously meshing with said planet gear; means to rotate said ring gear; a rotatable element fixed against rotation and shiftable axially with respect to said sun gear, means to rotate said rotatable element in a direction opposite said ring gear when said rotatable element is in a first position with respect to said sun gear; means to lock said rotatable element to said ring gear for rotation therewith when said rotatable element is in a second position with respect to said sun gear, and means to lock said rotatable element against rotation relative to said housing when said rotatable element is in a third position with respect to said sun gear.

14. The structure defined in claim 13, including means to selectively axially displace said rotatable element with respect to said sun gear, said last-mentioned means including means to lock said rotatable element in each of its axially displaced positions.

References Cited in the file of this patent
UNITED STATES PATENTS

| | | |
|---|---|---|
| 2,646,699 | Mueller et al. | July 28, 1953 |
| 2,719,439 | Driehaus | Oct. 4, 1955 |